United States Patent [19]

Haberl

[11] 4,336,040
[45] Jun. 22, 1982

[54] DUST SEPARATOR

[75] Inventor: Johann Haberl, Skärholmen, Sweden

[73] Assignee: Dustcontrol AB, Norsborg, Sweden

[21] Appl. No.: 232,263

[22] PCT Filed: May 31, 1979

[86] PCT No.: PCT/SE79/00126

§ 371 Date: Jan. 30, 1981

§ 102(e) Date: Jan. 30, 1981

[87] PCT Pub. No.: WO80/02651

PCT Pub. Date: Dec. 11, 1980

[30] Foreign Application Priority Data

Apr. 10, 1978 [SE] Sweden ............................. 7803978

[51] Int. Cl.³ ........................................... B01D 46/04
[52] U.S. Cl. ..................................... 55/304; 55/337;
55/429; 55/432; 55/472; 55/498; 55/502
[58] Field of Search ................ 55/304, 300, 337, 498,
55/429, 432, 467, 471, 472, 502

[56] References Cited

U.S. PATENT DOCUMENTS

| 3,240,000 | 3/1966 | Hayes | 55/337 |
|---|---|---|---|
| 3,425,192 | 2/1969 | Davis | 55/472 |
| 3,895,929 | 7/1975 | Jysky et al. | 55/429 |
| 3,902,999 | 9/1975 | Hawley | 55/337 |
| 4,172,710 | 10/1979 | Van der Molen | 55/470 |

FOREIGN PATENT DOCUMENTS 2053778 5/1972 Fed. Rep. of Germany .
363976 2/1974 Sweden .
981806 1/1965 United Kingdom .

Primary Examiner—Bernard Nozick
Attorney, Agent, or Firm—Berman, Aisenberg & Platt

[57] ABSTRACT

A dust separator, comprising a fan (27) with a drive motor (28), a cyclone separator (10, 11) which is connected to the suction side of the fan and is arranged as a coarse separator and provided with an inlet (11) for gaseous fluid mixed with dust, a filter (29–32) which projects freely coaxially into the cyclone apparatus (10, 11) and is arranged as a fine separator between the interior of the cyclone apparatus and the suction side of the fan, and an outlet (37) for cleaned gaseous fluid at the pressure side of the fan.

The filter (29–32) and the suction fan (27) with the drive motor (28) are arranged as a separate unit resiliently connected to the cyclone apparatus (10, 11). The filter (29–32) consists of a pleated outer cover (30) of filter material which is disposed round a perforated tubular core (29) and which is clamped between its ends and the pleats of which extend axially along the core (29) and are fixed to this at their inner folding edges, while the outer folding edges are free.

3 Claims, 1 Drawing Figure

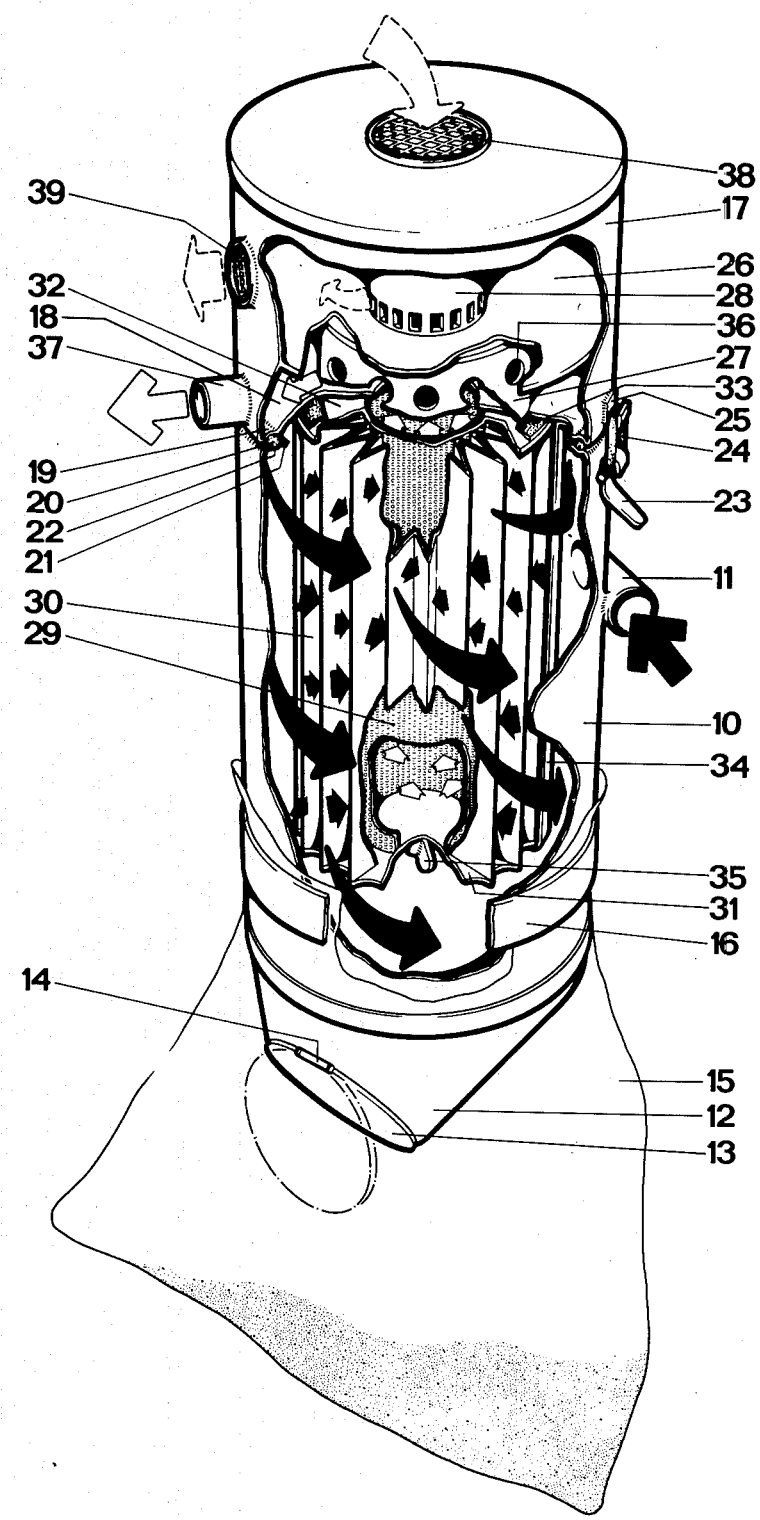

DUST SEPARATOR

The invention relates to a dust separator of the type which comprises a fan with a drive motor, a cyclone separator connected to the suction side of the fan as a coarse separator and provided with an inlet for a gaseous fluid mixed with dust, a filter projecting freely coaxially into the cyclone apparatus and arranged as a fine separator between the interior of the cyclone apparatus and the suction side of the fan, and an outlet for cleaned gaseous fluid at the pressure side of the fan. Such a dust separator is described, inter alia, in DE No. 2,053,778. In this case, the filter projecting freely coaxially into the cyclone apparatus consists of a cylindrical core with a plurality of rows of slits, which are covered by star-shaped filter elements which are fitted in an air-tight manner and are open towards the slits and which have the form of cassettes covered on all sides by a filter material. Together with the cyclone apparatus and the rest of the dust separator the filter forms an integrated rigid construction. For the cleaning of the filter there is a separate cleaning pipe to which pressurized air is supplied and which is rotatable by means of a motor to supply cleaning pulses of pressurized air to the several filter cassettes in turn. This blowing of the filter involves a considerable increase in cost of the dust separator, because it requires both pressurized air and electricity for its operation. It is important to keep the filter clean, because increasing coating or choking of the filter leads to a great reduction in the suction effect.

It was also previously known, in dust separators or vacuum cleaners, particularly for industrial purposes, to have a filter in the form of a tubular member with a smooth outside and to provide, for intermittent cleaning of the filter, some form of vibrator or other shaking mechanism operatively connected to the filter, which is switched on, manually or automatically, when the fan is switched off. The vibration or shaking of the filter cannot take place, however, during suction, because then there is a risk of particles of dust being pressed into the pores of the filter and sticking so hard in these that they then cannot be removed by vibration or shaking of the filter. The known devices for intermittent vibration or shaking of the filter mean that the dust separator is generally large and heavy. They are also expensive and require manual or electrical control.

In order to render possible continuous cleaning of the filter without risk of particles of dust being pressed tight into the pores of the filter in this manner, a dust separator of the kind referred to above is characterized, according to the invention, in that the filter and the suction fan with the drive motor are arranged as a separate unit resiliently connected to the cyclone apparatus, and in that the filter comprises a pleated outer casing of filter material disposed round a perforated tubular core and clamped between its ends, the pleats of which extend axially along the core and are fixed to this at their inner folding edges while the outer folding edges are free. Thus the necessary vibration of the filter is obtained without extra means by the action of the fan proper and its drive motor, which are running during the suction.

In the dust separator according to the invention the fine dust which is deposited on the filter, gradually forms a relatively hard surface covering. As a result of the fact that the filter is exposed to vibrations because it is mounted on the separate unit resiliently connected to the cyclone apparatus, the surface covering thus formed is shaken apart and the relatively large particles packed together are sucked by the air passing at high speed between the housing of the cyclone apparatus and the filter, to be pressed down to the bottom portion together with the coarse dust. The construction of the filter plays an important part in achieving this function. The outer, free folding edges form resilient elements, and through the powerful flow of air through the cyclone apparatus between the filter and the housing, particularly when this flow of air varies, as during cleaning, when the amount of air drawn in changes all the time, or through dust particles impinging on the filter, the outer covering will be moving continuously and as a result thereof substantially contributes to the cleaning of the filter.

The folding of the filter provides a larger filter surface and so a lower speed of the fluid passing through the filter than a cylindrical filter with a smooth surface, as a result of which vibration of the filter can take place even during suction without risk of blocking the filter.

As an alternative or complement to the constant cleaning the rotating mass of the fan and the drive motor can be unbalanced so that the filter is vibrated or shaken powerfully during at least some part of the time which it takes for the fan to go down in speed from full operational speed to a standstill, after the drive motor of the fan has been switched off, as a result of the fact that resonance occurs in one or more speed ranges.

In order to explain the invention an embodiment thereof will be described in more detail below with reference to the accompanying drawing which shows, in perspective with parts broken away, a dust separator (vacuum cleaner) according to the invention, intended for industrial use.

The dust separator shown comprises a coarse separator in the form of a cyclone apparatus with a cylindrical housing 10 which has a tangential inlet 11 at the top for the fluid mixed with dust, usually air, which is to be cleaned by the dust separator. At the bottom, the housing 10 is terminated by a collecting pocket 12 for separated dust, and this pocket has a discharge opening with a hatch 13 which is articulately suspended at its upper end at 14. A collecting bag (plastics bag) 15 is threaded over the lower end of the housing 10 and secured to the housing by means of a clamp band 16 so that the collecting pocket 12 and its discharge opening which can be closed by the hatch 13, are inside the collecting bag 15.

A fan housing 17 which is also cylindrical like the cyclone-apparatus housing 10 and has the same diameter as this, has a bottom 18 which, at the periphery thereof, forms a seat 19 for a resilient packing 20, for example an O-ring of rubber. At the top of the cyclone-apparatus housing 10 there is an inwardly directed flange 21 with a corresponding seat 22 for the packing 20, and the fan housing is detachably clamped to the upper end of the cyclone-apparatus housing 10 by a clamping device 23 with the interposition of the resilient packing 20, the clamping device 23 comprising a resilient eye 24, for example a rubber ring, which engages not only the clamping device 23 on the housing 10 but also a hook 25 on the fan housing 17. The detachable connections 23–25 must be provided at least at two diametrically opposite points, but there may be more of such connections. The fan housing 17 is thus resiliently connected to the cyclone-apparatus housing 10 by means of the elements 20 and 24.

In the fan housing 17 there is a partition 26 and below this partition there is disposed a suction fan 27 of high-pressure type, for example a multi-stage centrifugal fan with a high speed (10,000 revolutions per minute), while an electric drive motor 28, which is directly coupled to the suction fan, is disposed at the top of the partition 26. The suction side of the fan is in communication with the interior of the cyclone-apparatus housing 10 through a filter unit which comprises a tubular perforated cylindrical core 29, for example of cardboard, and a pleated cover 30 which can consist of any known filter material such as plasticised cardboard. At the bottom, the filter unit consisting of the elements 29 and 30 is closed by means of a bottom wall 31 while at the top this unit is closed only outside the tubular core 29 by means of an annular end wall 32. The interior of the tubular core 29, on the other hand, is in communication with the suction side of the fan 27. The filter unit is held bearing against the lower side of the bottom 18 with the interposition of a packing 33 by means of a yoke 34 which is fixed to the bottom 18 and is provided with a screw device 35 to press the filter unit against the bottom 18. Thus the filter unit 29–32 is mounted for easy exchange to the lower side of the fan housing 17. When the fan housing is mounted in position, the filter unit projects into the cyclone-apparatus housing 10, coaxially in this.

The fan 27 has a plurality of exhaust openings 36 which lead into the fan housing 17 in the space between the bottom 18 and the partition 26, and this space has an outlet socket 37 for the gaseous fluid which has been cleaned in the dust separator.

For the fan motor 28 there is provided an inlet 38 for cooling air in the upper end wall of the fan housing 17, while an outlet 39 for this cooling air is provided at the side of the fan housing. Thus the stream of cooling air is kept completely separate from that part of the dust separator through which there passes the gaseous fluid which is to be cleaned.

When the fan 27 is rotated by means of the motor 28, the hatch 13 is held shut as a result of the reduced pressure occurring in the cyclone-apparatus housing 10 and gaseous fluid mixed with dust is drawn in through the inlet 11 into the cyclone apparatus where the fluid together with impurities is caused to rotate along the inside of the cyclone-apparatus housing 10 because the fluid comes tangentially into the housing. Heavier and coarser particles of dust fall down into the collecting pocket 12 which is the known operation of a cyclone apparatus, while lighter particles of dust are drawn with the fluid towards the filter unit 29–32 where they are packed and cling to the outside of the cover 30. Because of the construction of the filter unit as described, the coarse-cleaned fluid passes with very low speed through the cover 30. As a result, the dust is deposited very gently on the outside of the cover 30. The cleaned gaseous fluid passes through the cover 30 and then through the perforated core 29 to enter the fan 27 at its suction side and then be blown out through the openings 36 and through the space in the fan housing 17 between the bottom 18 and the partition 26 to leave the dust separator again through the outlet socket 37.

The rotating mass of the fan 27 and the motor 28 nearly always is to some extent out of balance, even if very little, so that the fan and motor vibrate when the fan is in operation. This vibration, which may be stronger or weaker, is retransmitted to the fan housing 17 which, as a result, can vibrate or shake on the cyclone-apparatus housing 10. Thus the filter unit 29–32 also vibrates or shakes. During the time when the separation and filtering are taking place in the dust separator, the filter unit is thus kept constantly under vibration or shaking, which means that particles of dust which accumulate in large quantities on the outside of the cover 30, are shaken loose from the filter unit and fall down into the collecting pocket 12, even if they should form a relatively hard surface covering on the filter. In other words, the dust separator is self-cleaning. The fact that the particles do not penetrate into and stick in the cover 30 is due to the fact that this has a large area as a result of the pleating and that the speed of the fluid is therefore low. In practice it has been found that also fibrous impurities do not cling to the cover 30 harder than that they can be shaken loose by a rather gentle vibration of the filter unit, to be received by the collecting pocket 12. The circulation of the fluid in the cyclone-apparatus housing 10 in combination with the flow of fluid into and through the filter unit 29–32 have the effect that such fibrous impurities do not penetrate into the folds of the cover 30 but cling to the outer edges of the folds. From there, they are easily shaken down into the collecting pocket 12. The coarse dust, which does not cling to the filter, and the particles which are shaken loose therefrom, are sucked away by the stream of air passing at high speed between the housing 10 and the filter, and are pressed down into the collecting pocket 12.

Now in order to cause a more powerful vibration or shaking of the filter unit 29–32 and hence a more effective cleaning of the cover 30, it is possible to produce a greater unbalance of the rotating mass in the fan and the motor 28, and this unbalance also can be adjusted such that the rotating mass shakes violently as a result of resonance action at one or more speed ranges between the operational speed of the fan and a standstill. In this manner, while at the same time obtaining a continuous cleaning during operation of the dust separator, an intensified cleaning can be obtained each time the motor 28 is disconnected to stop the dust separator.

When the dust separator is in operation, the hatch 13 is held in the closed position by the reduced pressure in the cyclone-apparatus housing 10, as mentioned above, but when the dust separator is stopped, the hatch 13 will swing to the open position shown in chain line, so that emptying of the collecting pocket 12 is obtained automatically. The material in this pocket runs down into the collecting bag 15.

The filter unit 29–32 can easily be replaced, if necessary, after it has been used for a long time. The filter unit is of cheap material since it is made as a whole of cardboard material. The cover 30 should be glued to the perforated core 29 along the inside folding edges and it should also be glued to the end wall 31 at the bottom and to the annular end wall 32 at the top.

It has been found, in practical tests that the self-cleaning dust separator according to the invention can be made with a high degree of separation at a low weight and a small volume of the apparatus. In addition, it is fairly cheap and can be manufactured at costs on a level with conventional vacuum cleaners despite the fact that the separating effect is higher than in heavy industrial vacuum cleaners. 90–95% of the dust which is present in the incoming gaseous fluid is separated in the cyclone apparatus and the rest in the filter. The dust separator can be mounted stationary or on a mobile chassis, and it does not necessarily need to be mounted in a vertical position but can also be disposed in a horizontal position without being any less effective, but the collecting pocket must then of course be disposed otherwise than as shown here. It is also insensitive to moisture in the incoming fluid.

The dust separator can be mounted on a resilient chassis of thin steel tube. Even if the vibrations are then transmitted to a certain extent to the cyclone apparatus 10, 11, the filter-cleaning effect still remains good. The vibrations which are transmitted to the cyclone apparatus provide some advantage, just when the dust separator is shut off, since these vibrations contribute to the discharge of the impurities from the collecting pocket 12 to the collecting bag 15.

The space inside the filter 29-32 can be utilized for further filtering. For cleaning welding gas, a chemical filter can be inserted, and for the separation of asbestos, quartz and other materials harmful to health it is possible to have an extra filter with an extreme separating capacity inside the filter 29-32. These filters are of the throw-away filter type and are not cleaned under the action of the vibrations.

I claim:

1. A dust separator, comprising a cyclone apparatus having an inlet for gaseous fluid with dust entrained therein and an outlet, a fan having an inlet communicating with the cyclone outlet and an outlet for cleaned gaseous fluid at the pressure side thereof, a drive motor connected to the fan, a filter projecting freely coaxially into the cyclone apparatus to form a filtering connection between the interior of the cyclone apparatus and the suction side of the fan and including a perforated tubular core and a pleated outer cover of filter material surrounding the core and clamped between the ends thereof to said fan, the pleats of said cover extending axially along the core and being fixed thereto at the inner folding edges thereof while the outer folding edges are free, said fan and the drive motor thereof forming together with the filter a separate unit, and means resiliently connecting said unit to the cyclone apparatus.

2. A dust separator as claimed in claim 1, characterized in that the rotating mass of the fan (27) and the drive motor (28) is unbalanced.

3. A dust separator as claimed in claim 2, characterized in that a marked unbalance is provided in one or more limited speed ranges below the normal operational speed of the fan (27).

* * * * *